US009120964B2

(12) United States Patent
Reyes et al.

(10) Patent No.: US 9,120,964 B2
(45) Date of Patent: Sep. 1, 2015

(54) TREATMENT FLUIDS CONTAINING BIODEGRADABLE CHELATING AGENTS AND METHODS FOR USE THEREOF

(75) Inventors: Enrique A. Reyes, Duncan, OK (US); Thomas D. Welton, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 461 days.

(21) Appl. No.: 13/094,248

(22) Filed: Apr. 26, 2011

(65) Prior Publication Data

US 2012/0097392 A1 Apr. 26, 2012

Related U.S. Application Data

(63) Continuation-in-part of application No. 13/051,827, filed on Mar. 18, 2011, which is a continuation-in-part of application No. 11/499,447, filed on Aug. 4, 2006.

(51) Int. Cl.
| | |
|---|---|
| *C09K 8/528* | (2006.01) |
| *C02F 5/12* | (2006.01) |
| *C09K 8/68* | (2006.01) |
| *C09K 8/74* | (2006.01) |
| *C09K 8/78* | (2006.01) |
| *C09K 8/84* | (2006.01) |
| *C09K 8/86* | (2006.01) |

(52) U.S. Cl.
CPC . *C09K 8/528* (2013.01); *C02F 5/12* (2013.01); *C09K 8/68* (2013.01); *C09K 8/74* (2013.01); *C09K 8/78* (2013.01); *C09K 8/845* (2013.01); *C09K 8/86* (2013.01); *Y02W 10/37* (2013.01)

(58) Field of Classification Search
None
See application file for complete search history.

(56) References Cited

U.S. PATENT DOCUMENTS

| | | |
|---|---|---|
| 104,950 A | 7/1870 | Fuller |
| 139,298 A | 5/1873 | Danforth et al. |
| 142,166 A | 8/1873 | Kromer |
| 182,761 A | 10/1876 | Kelly |
| 209,108 A | 10/1878 | Brokhahne |
| 3,333,634 A | 8/1967 | Townsend et al. |
| 3,684,720 A | 8/1972 | Richardson |
| 3,889,753 A | 6/1975 | Richardson |
| 4,089,787 A | 5/1978 | Lybarger et al. |
| 4,090,563 A | 5/1978 | Lybarger et al. |
| 4,353,805 A | 10/1982 | Kragen et al. |
| 4,428,432 A | 1/1984 | Pabley |
| 4,532,047 A | 7/1985 | Dubin |
| 4,540,448 A | 9/1985 | Gautier et al. |
| 4,595,512 A | 6/1986 | Tellier et al. |
| 4,708,207 A | 11/1987 | Kalfayan et al. |
| 5,183,122 A | 2/1993 | Rowbotham et al. |
| 5,207,778 A | 5/1993 | Jennings, Jr. |
| 5,259,980 A | 11/1993 | Morris et al. |
| 5,293,942 A | 3/1994 | Gewanter et al. |
| 5,335,733 A | 8/1994 | Sandiford et al. |
| 5,346,010 A | 9/1994 | Adams et al. |
| 5,481,018 A | 1/1996 | Athey et al. |
| 5,529,125 A | 6/1996 | Di Lullo Arias et al. |
| 5,672,279 A | 9/1997 | Sargent et al. |
| 5,783,524 A | 7/1998 | Greindl et al. |
| 5,786,313 A | 7/1998 | Schneider et al. |
| 5,897,699 A | 4/1999 | Chatterji et al. |
| 5,979,557 A | 11/1999 | Card et al. |
| 6,063,738 A | 5/2000 | Chatterji et al. |
| 6,140,277 A | 10/2000 | Tibbles et al. |
| 6,165,947 A | 12/2000 | Chang et al. |
| 6,263,967 B1 | 7/2001 | Morris et al. |
| 6,315,045 B1 | 11/2001 | Brezinski |
| 6,399,546 B1 | 6/2002 | Chang et al. |
| 6,436,880 B1 | 8/2002 | Frenier |
| 6,525,011 B2 | 2/2003 | Brezinski |
| 6,534,448 B1 | 3/2003 | Brezinski |
| 6,547,871 B2 | 4/2003 | Chatterji et al. |

(Continued)

FOREIGN PATENT DOCUMENTS

| | | |
|---|---|---|
| EP | 0073599 A1 | 3/1983 |
| EP | 0976911 A1 | 2/2000 |

(Continued)

OTHER PUBLICATIONS

Gdanski, Kinetics of Tertiary Reaction of HF on Alumino-Silicates; Society of Petroleum Engineers, Inc., International Symposium on Formation Damage Control held in Lafayette, LA, Feb. 1996, SPE 31076.

Shuchart et al., Improved Success in Acid Stimulations with a New Organic-HF System; Society of Petroleum Engineers, Inc., European Petroleum Conference held in Milan, Italy, Oct. 1996, SPE 36907.

Office Action for U.S. Appl. No. 12/053,875 dated Jan. 20, 2011.

(Continued)

*Primary Examiner* — Angela M DiTrani
(74) *Attorney, Agent, or Firm* — McDermott Will & Emery LLP; Craig W. Roddy

(57) ABSTRACT

Treatment fluids containing biodegradable chelating agents can be used in various treatment methods. The methods can comprise providing a treatment fluid that comprises an aqueous base fluid and a chelating agent composition, and introducing the treatment fluid into at least a portion of a subterranean formation. The treatment fluids can also be used for treatment of pipes or tubing such as, for example, well bore pipes or tubing penetrating a subterranean formation and above-ground pipelines. Illustrative biodegradable chelating agents include, but are not limited to, glutamic acid diacetic acid, methylglycine diacetic acid, β-alanine diacetic acid, S,S-ethylenediaminedisuccinic acid, iminodisuccinic acid, hydroxyiminodisuccinic acid, any salt thereof, any derivative thereof, and any combination thereof. The treatment fluids can optionally comprise an acid, which can include hydrofluoric acid or a hydrofluoric acid generating compound.

9 Claims, 1 Drawing Sheet

(56) References Cited

U.S. PATENT DOCUMENTS

| | | |
|---|---|---|
| 6,549,814 B1 | 4/2003 | Strutz et al. |
| 6,569,814 B1 | 5/2003 | Brady et al. |
| 6,706,668 B2 | 3/2004 | Brezinski |
| 6,746,611 B2 | 6/2004 | Davidson |
| 6,762,154 B2 | 7/2004 | Lungwitz et al. |
| 6,806,236 B2 | 10/2004 | Frenier et al. |
| 6,828,280 B2 | 12/2004 | England et al. |
| 6,881,709 B2 | 4/2005 | Nelson et al. |
| 6,903,054 B2 | 6/2005 | Fu et al. |
| 6,924,253 B2 | 8/2005 | Palmer et al. |
| 6,929,070 B2 | 8/2005 | Fu et al. |
| 6,978,838 B2 | 12/2005 | Parlar et al. |
| 6,984,705 B2 | 1/2006 | Chang et al. |
| 6,987,083 B2 | 1/2006 | Phillippi et al. |
| 7,028,775 B2 | 4/2006 | Fu et al. |
| 7,036,585 B2 | 5/2006 | Zhou et al. |
| 7,052,901 B2 | 5/2006 | Crews |
| 7,059,414 B2 | 6/2006 | Rae et al. |
| 7,069,994 B2 | 7/2006 | Cooke, Jr. |
| 7,114,567 B2 | 10/2006 | Chan et al. |
| 7,159,659 B2 | 1/2007 | Welton et al. |
| 7,192,908 B2 | 3/2007 | Frenier et al. |
| 7,208,529 B2 | 4/2007 | Crews |
| 7,228,904 B2 | 6/2007 | Todd et al. |
| 7,261,160 B2 | 8/2007 | Welton et al. |
| 7,299,874 B2 | 11/2007 | Welton et al. |
| 7,303,012 B2 | 12/2007 | Chan et al. |
| 7,303,019 B2 | 12/2007 | Welton et al. |
| 7,306,041 B2 | 12/2007 | Milne et al. |
| 7,380,602 B2 | 6/2008 | Brady et al. |
| 7,380,606 B2 | 6/2008 | Pursley et al. |
| 7,427,584 B2 | 9/2008 | Frenier et al. |
| 7,589,050 B2 | 9/2009 | Frenier et al. |
| 7,655,603 B2 | 2/2010 | Crews |
| 7,687,439 B2 | 3/2010 | Jones et al. |
| 7,786,051 B2 * | 8/2010 | Lange et al. ............... 507/219 |
| 7,963,722 B2 * | 6/2011 | Kogler ............... 405/184 |
| 8,071,511 B2 | 12/2011 | Welton et al. |
| 8,312,929 B2 | 11/2012 | Frenier et al. |
| 8,567,503 B2 | 10/2013 | Welton et al. |
| 8,567,504 B2 | 10/2013 | Welton et al. |
| 8,881,823 B2 | 11/2014 | Collins et al. |
| 9,027,647 B2 | 5/2015 | Reyes et al. |
| 9,074,120 B2 | 7/2015 | Welton |
| 2002/0070022 A1 | 6/2002 | Chang et al. |
| 2002/0076803 A1 | 6/2002 | Crews |
| 2003/0054962 A1 | 3/2003 | England et al. |
| 2003/0104950 A1 | 6/2003 | Frenier et al. |
| 2003/0139298 A1 | 7/2003 | Fu et al. |
| 2003/0166472 A1 | 9/2003 | Pursley et al. |
| 2004/0009880 A1 | 1/2004 | Fu |
| 2004/0011527 A1 | 1/2004 | Jones et al. |
| 2004/0176478 A1 | 9/2004 | Dahayanake et al. |
| 2004/0177960 A1 | 9/2004 | Chan et al. |
| 2004/0192995 A1 | 9/2004 | Deshpande et al. |
| 2004/0235677 A1 | 11/2004 | Nguyen et al. |
| 2004/0254079 A1 * | 12/2004 | Frenier et al. ............... 507/260 |
| 2005/0124525 A1 | 6/2005 | Hartshorne et al. |
| 2005/0126781 A1 | 6/2005 | Reddy et al. |
| 2005/0209108 A1 | 9/2005 | Fu et al. |
| 2005/0233911 A1 | 10/2005 | Samuel |
| 2006/0013798 A1 | 1/2006 | Henry et al. |
| 2006/0014648 A1 | 1/2006 | Milson et al. |
| 2006/0025321 A1 | 2/2006 | Treybig et al. |
| 2006/0041028 A1 | 2/2006 | Crews |
| 2006/0054325 A1 | 3/2006 | Brown et al. |
| 2006/0131022 A1 | 6/2006 | Rae et al. |
| 2006/0180309 A1 | 8/2006 | Welton et al. |
| 2006/0180310 A1 | 8/2006 | Welton et al. |
| 2006/0183646 A1 | 8/2006 | Welton et al. |
| 2006/0258541 A1 | 11/2006 | Crews |
| 2007/0060482 A1 | 3/2007 | Welton et al. |
| 2007/0158067 A1 | 7/2007 | Xiao et al. |
| 2007/0213233 A1 | 9/2007 | Freeman et al. |
| 2007/0281868 A1 | 12/2007 | Pauls et al. |
| 2008/0035339 A1 | 2/2008 | Welton et al. |
| 2008/0035340 A1 | 2/2008 | Welton et al. |
| 2008/0039347 A1 | 2/2008 | Welton et al. |
| 2008/0190609 A1 | 8/2008 | Robb et al. |
| 2008/0194427 A1 | 8/2008 | Welton et al. |
| 2008/0194428 A1 | 8/2008 | Welton et al. |
| 2008/0194430 A1 | 8/2008 | Welton et al. |
| 2008/0200354 A1 | 8/2008 | Jones et al. |
| 2008/0287324 A1 | 11/2008 | Pursley et al. |
| 2009/0008095 A1 | 1/2009 | Duncum et al. |
| 2009/0042748 A1 | 2/2009 | Fuller |
| 2009/0042750 A1 | 2/2009 | Pauls et al. |
| 2009/0075844 A1 * | 3/2009 | Ke et al. ............... 507/90 |
| 2009/0192054 A1 | 7/2009 | Frenier et al. |
| 2009/0192057 A1 | 7/2009 | Frenier et al. |
| 2009/0264325 A1 | 10/2009 | Atkins et al. |
| 2009/0291863 A1 | 11/2009 | Welton et al. |
| 2010/0137168 A1 | 6/2010 | Quintero et al. |
| 2010/0212896 A1 | 8/2010 | Navarro et al. |
| 2010/0276152 A1 | 11/2010 | De Wolf et al. |
| 2010/0311622 A1 | 12/2010 | Knox |
| 2011/0028358 A1 | 2/2011 | Welton et al. |
| 2011/0053811 A1 | 3/2011 | Horton et al. |
| 2011/0059873 A1 | 3/2011 | Weerasooriya et al. |
| 2011/0061870 A1 | 3/2011 | Navarro-mascarell et al. |
| 2011/0201531 A1 | 8/2011 | Sharma et al. |
| 2011/0214874 A1 | 9/2011 | Dakin et al. |
| 2011/0259592 A1 | 10/2011 | Reyes |
| 2011/0290482 A1 | 12/2011 | Weerasooriya et al. |
| 2012/0000652 A1 | 1/2012 | Jones et al. |
| 2012/0067576 A1 | 3/2012 | Reyes et al. |
| 2012/0097392 A1 | 4/2012 | Reyes et al. |
| 2012/0115759 A1 | 5/2012 | Reyes |
| 2012/0145401 A1 | 6/2012 | Reyes |
| 2012/0181033 A1 | 7/2012 | Saini et al. |
| 2012/0202720 A1 | 8/2012 | de Wolf et al. |
| 2012/0260938 A1 | 10/2012 | Zack et al. |
| 2013/0023449 A1 * | 1/2013 | Heath et al. ............... 507/221 |
| 2013/0025870 A1 | 1/2013 | Berry et al. |
| 2013/0213659 A1 | 8/2013 | Luyster et al. |

FOREIGN PATENT DOCUMENTS

| | | |
|---|---|---|
| EP | 1 004 571 A1 | 5/2000 |
| EP | 1004571 A1 | 5/2000 |
| EP | 1188772 A2 | 3/2002 |
| EP | 1520085 A1 | 4/2005 |
| EP | 1817391 A2 | 8/2007 |
| EP | 2 371 923 A1 | 4/2010 |
| EP | 2371923 A1 | 10/2011 |
| WO | 9640625 A1 | 12/1996 |
| WO | 0142387 A1 | 6/2001 |
| WO | 2004005671 A1 | 1/2004 |
| WO | 2004/090282 A1 | 10/2004 |
| WO | 2005/121273 A1 | 12/2005 |
| WO | WO 2006/054261 A2 | 5/2006 |
| WO | 2007/022307 A2 | 2/2007 |
| WO | 2009002078 A2 | 12/2008 |
| WO | 2009/091652 A2 | 7/2009 |
| WO | 2009086954 A1 | 7/2009 |
| WO | WO2009/091652 A2 | 7/2009 |
| WO | WO 2009086954 * 7/2009 ............... C09K 8/74 |
| WO | 2009/137399 A2 | 11/2009 |
| WO | WO2009/137399 A2 | 11/2009 |
| WO | 2010/053904 A2 | 5/2010 |
| WO | WO 2010/053904 A2 | 5/2010 |
| WO | 2012/000915 A1 | 1/2012 |
| WO | 2012/080296 A1 | 6/2012 |
| WO | 2012/080297 A1 | 6/2012 |
| WO | 2012/080298 A1 | 6/2012 |
| WO | 2012/080299 A1 | 6/2012 |
| WO | 2012/080463 A1 | 6/2012 |
| WO | WO 2012/080296 A1 | 6/2012 |
| WO | WO 2012/080297 A1 | 6/2012 |
| WO | WO 2012/080298 A1 | 6/2012 |
| WO | WO 2012/080299 A1 | 6/2012 |
| WO | WO 2012/080463 A1 | 6/2012 |
| WO | WO2012080299 * 6/2012 ............... C09K 8/60 |
| WO | 2012/113738 A1 | 8/2012 |

(56) References Cited

FOREIGN PATENT DOCUMENTS

| WO | WO2012/113738 | * | 8/2012 | ............ C07C 229/24 |
|---|---|---|---|---|
| WO | 2012/171858 A1 | | 12/2012 | |
| WO | 2013/015870 A1 | | 1/2013 | |
| WO | 2013115981 A1 | | 8/2013 | |
| WO | 2014028375 A1 | | 2/2014 | |

OTHER PUBLICATIONS

Office Action for U.S. Appl. No. 11/499,446 dated Mar. 9, 2011.
Office Action for U.S. Appl. No. 11/499,447 dated Mar. 9, 2011.
Mahmoud et al., Stimulation of Carbonate Reservoirs Using GLDA (Chelating Agent) Solutions, SPE 2010, Society of Petroleum Engineers, SPE 132286.
Mahmoud et al., Optimum Injection Rate of a New Chelate That Can Be Used to Stimulate Carbonate Reservoirs, SPE 2010, Society of Petroleum Engineers, SPE 133497.
Mahmoud et al., Evaluation of a New Environmentally Friendly Chelating Agent for High-Temperature Applications, SPE 2010, Society of Petroleum Engineers, SPE 127923.
Lepage et al., An Environmentally Friendly Stimulation Fluid for High-Temperature Applications, SPE 2009, Society of Petroleum Engineers, SPE 121709.
Mahmoud et al., An Effective Stimulation Fluid for Deep Carbonate Reservoirs: A Core Flood Study, SPE 2010, Society of Petroleum Engineers, SPE 131626.
Lingling et al., Impact of Organic Acids/Chelating Agents on the Rheological Properties of an Amidoamine-Oxide Surfactant, SPE 2011, Society of Petroleum Engineers, SPE 128091.
Nitschke et al., Biodegradation and Aquatic Toxicity of β-Alaninediacetic Acid; Bavarian Sate Bureau for Water Resources Management, Institute for Water Research,Chemosphere, vol. 34, No. 4., pp. 807-815, 1996.
Whitburn et al., Chemical Speciation of Ethylenediamine-N,N'-Disuccinic Acid (EDDS) and its Metal Complexes in Solution, Chemical Speciation and Bioavailability, pp. 85-91, 1999.
Boethling et al., Designing Small Molecules for Biodegradability, Chem. Rev. 2007, 107, 2207-2227.
BASF, The Chemical Company, Drivers, Trends & Regulations Power Point Presentation, not dated.
National Industrial Chemicals Notification and Assessment Scheme, Full Public Report, Methyl Glycine Diacetic Acid, Trisodium Salt, File No. STD/1092, 2004.
Tandy et al., Extraction of Heavy Metals from Soils Using Biodegradable Chelating Agents, Institute of Terrestrial Ecology, Environ. Sci. Technol, 2004, 38, 937-944.
BASF Technical Information TI/EVD 1418e, Trilon M Types; May 2007.
Boethling et al., Designing Small Molecules for Biodegradability; Chem. Rev. 2007, 107, 2207-2227.
Nowac, Environmental Chemistry of Aminopolycarboxylate Chelating Agents; Environ. Sci. Tech, 2002; 36(19), 4009-4016.
Frenier et al.; Use of Highly Acid-Soluble Chelating Agents in Well Stimulation Services, SPE 63242, 2000.
Collins et al., A Biodegradable Chelating Agent Designed to be an Environmentally Friendly Filter-Cake Breaker, SPE 140816, 2011.
AkzoNobel Brochure; AkzoNobel in the Oilfield Industry, 2008.
International Search Report and Written Opinion for PCT/GB2012/000406 dated Jul. 18, 2012.
Mahmoud et al., Sandstone Acidizing Using a New Class of Chelating Agents; Society of Petroleum Engineers, SPE 139815, 2011.
Abrams et al., "The Development and Application of a High PH Acid Stimulation System for a Deep Mississippi Gas Well," American Institute of Mining, Metallurgical and Petroleum Engineers, Inc., 53rd Annual Fall Technical Conference and Exhibition held in Houston, TX, 1978, SPE 7565.
Lepage et al., "An Environmentally Friendly Stimulation Fluid for High-Temperature Applications," SPE Journal XP009160538, 2011.
International Search Report and Written Opinion for PCT/GB2012/000247 dated Jul. 12, 2012.
International Search Report and Written Opinion for PCT/GB2012/000385 dated Aug. 13, 2012.
"Scale," Sintef Petroleum Research, www.sintef.com, 2006.
AATCC Test Method 149-2002, Sep. 27, 2006.
Advanced Corrosion and Scale Management in Oil and Gas, 2006.
AkzoNobel in the Oilfield Industry, 2008.
BASF, Performance Chemcials, not dated.
BASF, Technical Bulletin, Trilon M Types, May 2007.
Fighting Scale—Removal and Prevention, 1999.
Simultaneous Gravel Packing and Filter-Cake Cleanup with Shunt Tubes, 2002.
Halliburton Top Technology Solutions 2006.
IPTC 14932, Challenges During Shallow and Deep Carbonate Reservoirs Stimulation, 2011.
Integrated Risk Analysis for Scale Management in Deepwater Developments, 2005.
Chemosphere vol. 34 Num 4, Biodegradation and Aquatic Toxicity of ADA, 1997.
Critical Review, Environmental Chemistry of Aminopolycarboxylate Chelating Agents, 2002.
Rohit Mittal Thesis, TAMU.
Chemical Stimulation in Near Wellbore Geothermal Formations, Jan. 2007.
Schlumberger Oilfield Glossary for Scale, 2007.
Six Steps to Successful Sandstone Acidizing, 2008.
SPE Production and Facilities, 2004, Hot oil and gas wells can be stimulated without acid.
SPE 30419, Alternate acid blends for HPHT applications, 1995.
SPE Production and Facilities, 2004, Organic Acids in carbonate acidizing.
SPE 80597, a biodegradable chelating agent is developed for stimulation of oil and gas formations, 2003.
SPE 121803, Wormhole formation in carbonates under varying temperature conditions, 2009.
SPE 121464, The optimum injection rate for wormhole propagation: myth or reality? 2009.
SPE 141410, Scale formation prevention during ASP flooding, 2011.
Chem. Rev. 2007, Designing Small Molecules for Biodegradability; Boethling, R.S.; Sommer, E.; DiFiore, D., pp. 2207-2227.
Environ. Sci. Tech. 2002, Environmental Chemistry of Aminopolycarboxylate Chelating Agents; Bernd Nowack; 36(19), 4009-4016.
Technical Information Paper XP-002457846.
Removal of Filter Cake Generated by Manganese Tetraoxide Water-Based Drilling Fluids, Abdullah Mohammed A. Al Mojil, Texas A&M, Aug. 2010.
Removing of Formation Damage and Enhancement of Formation Productivity Using Environmentally Friendly Chemicals, Mohammed Ahmed Nasr Eldin Mahmoud, Texas A&M, May 2011.
International Search Report and Written Opinion for PCT/US2013/021562 dated May 24, 2013.
Kalfayan, Leonard, "Production Enhancement with Acid Stimulation," PennWell Corporation, 2000.
Kalfayan, Leonard, "Production Enhancement with Acid Stimulation," 2nd Ed., PennWell Corporation, 2008.
Dean et al., "Evaluation of 4-Hydroxy-6-Methyl-3-Pyridinecarboxylic Acid and 2,6-Dimethyl-4-Hydroxy-3-Pyridinecarboxylic Acid as Chelating Agents for Iron and Aluminum," Inorganica Chimica Acta 373 (2011), 179-186.
Chaves et al., "Alkylaryl-Amino Derivatives of 3-Hydroxy-4-Pyridinones as Aluminum Chelating Agents with Potential Clinical Application," Journal of Inorganic Biochemistry 97 (2003), 161-172.
Sija et al., "Interactions of Pyridinecarboxylic Acid Chelators with Brain Metail Ions: Cu(II), Zn(II), and Al(III)," Monatsh Chem (2011), 142:399-410.
Walther, John V., "Relation Between Rates of Aluminosilicate Mineral Dissolution, pH, Temperature, and Surface Charge," American Journal of Science, vol. 296, Summer, 1996, p. 693-728.
Clark et al., "Mixing and Aluminum Precipitation," Environ. Sci. Technol. 1993, 27, 2181-2189.
Duckworth et al., "Quantitative Structure—Activity Relationships for Aqueous Metal-Siderophore Complexes," Environ. Sci. Technol. 2009, 43, 343-349.

(56) References Cited

OTHER PUBLICATIONS

Fein et al., "Experimental Stud of Aluminum and Calcium Malonate Complexation at 25, 35, and 80° C," Geochimica et Cosmochimica Acta, vol. 59, No. 6, pp. 1053-1062, 1995.
Moeller et al., "The Stabilities and Thermodynamic Functions for the Formation of Aluminium and Mercury (II) Chelates of Certain Polyaminepolyacetic Acids," J. Inorg. Nucl. Chem., 1966, vol. 28, pp. 153 to 159.
Kruck et al., "Synthesis of Feralex a Novel Aluminum/Iron Chelating Compound," Journal of Inorganic Biochemistry 88 (2002), 19-24.
Feng et al., "Aluminum Citrate: Isolationa nd Structural Characterization of a Stable Trinudear Complex," Inorg, Chem. 1990, 29, 408-411.

* cited by examiner

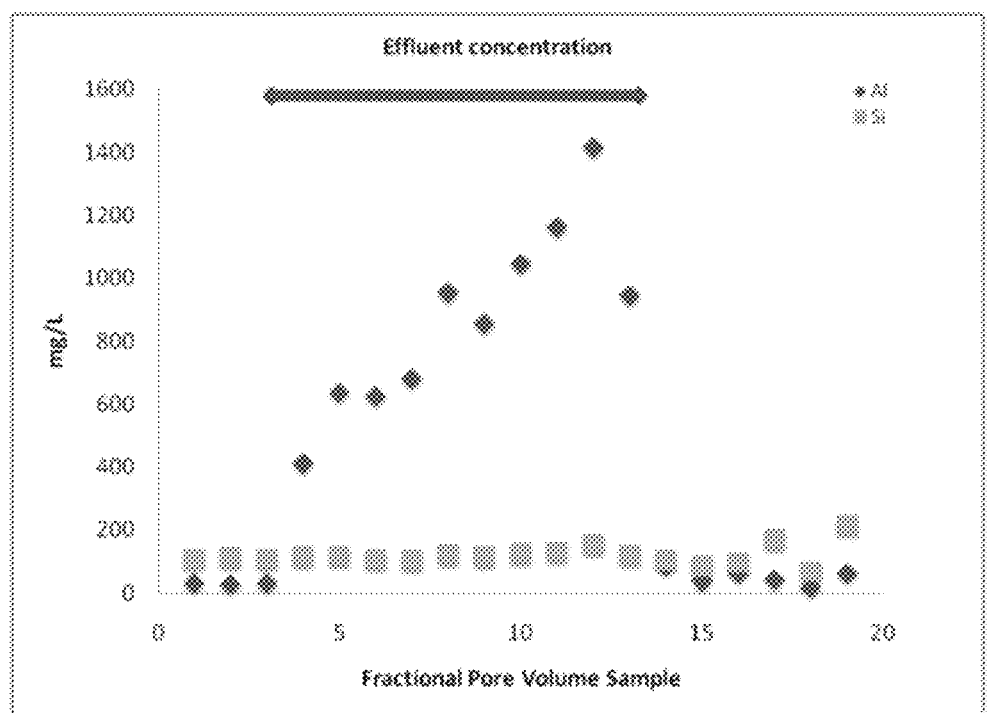

TREATMENT FLUIDS CONTAINING BIODEGRADABLE CHELATING AGENTS AND METHODS FOR USE THEREOF

CROSS-REFERENCE TO RELATED APPLICATIONS

This application is a continuation-in-part of U.S. patent application Ser. No. 13/051,827, filed Mar. 18, 2011 and now published as US 2012/0067576, which is a continuation-in-part of U.S. patent application Ser. No. 11/499,447, filed Aug. 4, 2006 and now patented as U.S. Pat. No. 8,567,504, each of which is incorporated herein by reference in its entirety whether or not expressly set forth herein.

BACKGROUND

The present invention generally relates to treatment fluids containing chelating agents, and, more particularly, to treatment methods using treatment fluids that contain biodegradable chelating agents.

Treatment fluids can be used in a variety of subterranean treatment operations. Such treatment operations can include, without limitation, drilling operations, stimulation operations, production operations, and sand control treatments. As used herein, the terms "treat," "treatment" and "treating" refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing treatments, scale dissolution and removal, consolidation treatments, and the like. In alternative embodiments, treatment operations can refer to an operation conducted in a pipe, tubing, or like vessel in conjunction with achieving a desired function and/or for a desired purpose (e.g., scale removal).

In acidizing treatments, for example, subterranean formations comprising acid-soluble components, such as those present in carbonate and sandstone formations, are contacted with a treatment fluid comprising an acid to dissolve the formation matrix. After acidization is completed, the treatment fluid and salts dissolved therein may be recovered by producing them to the surface (e.g., "flowing back" the well), leaving a desirable amount of voids or conductive pathways (e.g., wormholes in carbonates) within the formation. Acidization can enhance the formation's permeability and may increase the rate at which hydrocarbons are subsequently produced from the formation.

Acidizing a siliceous formation (e.g., a sandstone formation or a clay-containing formation) should be distinguished from acidizing a carbonate formation. Carbonate formations can be treated with a variety of acid systems, including mineral acids (e.g., hydrochloric acid), and organic acids (e.g., acetic and formic acids), often with similar success, where the acidity of the treatment fluid alone can be sufficient to solubilize formation cations. The treatment of siliceous formations with these acids, however, may have little or no effect because they do not react appreciably with the silica and silicates that characterize siliceous formations. As used herein, the term "siliceous" refers to the characteristic of having silica and/or silicate, including aluminosilicates. Most sandstone formations are composed of about 40% to about 98% sand quartz particles, i.e., silica ($SiO_2$), bonded together by various amounts of cementing material including carbonate (calcite or $CaCO_3$), aluminosilicates, and silicates.

By far the most common method of treating sandstone and other siliceous formations involves introducing corrosive, very low pH acids comprising hydrofluoric acid into the well bore and allowing the acid to react with the formation matrix. In contrast to other mineral acids, hydrofluoric acid is very reactive with aluminosilicates and silicates (e.g., sandstone, clays and feldspars). Hydrochloric acid may be used in addition to hydrofluoric acid in the treatment fluid to maintain a low pH as hydrofluoric acid is spent during a treatment operation, thereby retaining certain dissolved species in a highly acidic solution. Hydrofluoric acid acidizing is often used to remove damage within the formation. Such treatments are generally not considered "stimulating" in the sense of creating or extending fractures in the formation as in a typical fracturing operation. As a result of a hydrofluoric acid treatment, it is desirable that the skin value in the formation be zero. It is not anticipated that it will be less than zero. Any damage left behind gives a positive skin value, which is not desirable.

Hydrofluoric acid can interact with the formation matrix, base fluids, or formation fluids to create precipitates, particularly in the presence of metal ions such as $Al^{3+}$, $Fe^{2+}$, Group 1 metal ions (e.g., $Na^+$ and $K^+$) and/or Group 2 metal ions (e.g., $Mg^{2-}$, $Ca^{2+}$, and $Ba^{2+}$), thereby leading to further damage and a positive skin value. For instance, hydrofluoric acid tends to react very quickly with authigenic clays (e.g., smectite, kaolinite, illite and chlorite), especially at temperatures above 200° F. and below pH 1, as a function of mineral surface area. Because of this quick reaction, the hydrofluoric acid may penetrate only a short distance into the formation before becoming spent. Simultaneously, precipitation of various aluminum and silicon complexes can occur as a result of the reaction of the acid with the siliceous minerals. Damage to the formation can result from this precipitation. At certain temperatures and subterranean conditions, dissolution of a sandstone matrix or like siliceous material may occur so rapidly that uncontrolled precipitation can become an inevitable problem. The precipitation products can plug pore spaces and reduce the porosity and permeability of the formation, thus impairing flow potential.

Because clays are normally a part of the cementitious material that holds the sand grains of siliceous formations together, the dissolution of clay also weakens and de-consolidates the formation matrix in the vicinity of the well bore, thus causing damage to the formation. The damaging effects due to both the de-consolidation of the matrix and the precipitation of complexes can clog the pore spaces of the formation and eliminate or even revert the stimulation effect of an acidizing treatment.

Of particular concern is the formation of calcium fluoride, fluorosilicates, or other insoluble fluoro compounds during hydrofluoric acid acidizing treatments, which can negate the effectiveness of the treatment and cause damage to the formation. This can lead to production delays while damage control operations are conducted. The fluorosilicates can be of particular concern because they are the primary product of the dissolution of a clay and hydrofluoric acid. In addition, fluorosilicates are difficult to remediate. Calcium fluoride can be a later concern in the process, because the fluoride anion needs to be present in its free ion form, and that does not happen until a higher pH is reached. Calcium fluoride can be remediated, in some instances. Remediation techniques include a commercially available treatment system from Halliburton Energy Services, Inc. known as "F-SOL" acid system, which can be used to dissolve calcium fluoride. Another source of concern is the production of fluoroaluminates as a consequence of the reaction of fluorosilicates with clay minerals. Fluoroaluminates are thought to be soluble as long as the pH is below about 2 and the ratio of F/Al is maintained below about 2.5. If precipitated, their dissolution requires strong HCl (>5%).

Avoiding the formation of calcium fluoride, fluorosilicates, or other insoluble fluoro compounds can be a primary design objective in a treatment operation conducted in a subterranean formation or elsewhere. Various means have been used with mixed success. Blends of organic acids and hydrofluoric acid have been used to slow the dissolution kinetics of sandstone formation solids. However, as organic acids have higher pKa values than do mineral acids, precipitation can become problematic as the treatment fluid's pH rises. Pre-flush sequences with acids have been used to remove calcium salts from sandstone formations, before the main acidizing sequence is conducted to remove formation aluminosilicates. Generally, these flushes do not spend completely and typically return, upon flowback, with a persisting low pH. This can result in corrosion of downhole tubular goods (including coiled tubing) and surface equipment. Other multi-stage sandstone acidizing treatment operations have also been developed, particularly to remove calcium ions.

Chelating agents can also be included in treatment fluids to sequester at least a portion of the formation cations that cause unwanted precipitation. However, there are certain operational problems that are encountered with use of many common chelating agents. First, many common chelating agents are not biodegradable or present other toxicity concerns that make their use in a subterranean formation problematic. Further, the salt form of some chelating agents can actually exacerbate precipitation problems in a hydrofluoric acid acidizing treatment rather than lessening the amount of precipitated solid.

Likewise, chelating agents can be used in treating pipelines, tubing, and like vessels by removing metal ion scale from the pipeline or tubing surface. In such treatment operations, significant waste disposal issues can be encountered, since chelating agents that have commonly been used for such purposes are not biodegradable.

In addition to the foregoing, precipitation of formation cations in matrix acidizing operations can also be problematic, even when non-siliceous portions of a subterranean formation are being treated. Although most formation cations can be dissolved with strong acid treatment fluids, dissolution of the formation matrix spends the acid. As the pH of the treatment fluid rises, certain cations can precipitate and damage the formation. In addition, the use of very strong acids in a subterranean formation can lead to downhole corrosion issues, as previously mentioned. These issues can also be encountered when treating pipelines, tubing, and like vessels with an acidic fluid. Sequestration of precipitatable cations in non-siliceous formations or in pipelines, tubing, or like vessels can likewise benefit from a chelating agent in much the same manner as that described above for siliceous formations by keeping the cation in a soluble state over a broad pH range.

SUMMARY OF THE INVENTION

The present invention generally relates to treatment fluids containing chelating agents, and, more particularly, to treatment methods using treatment fluids that contain biodegradable chelating agents.

In one embodiment, the present invention provides a method comprising: providing a treatment fluid that comprises: an aqueous base fluid; and a chelating agent composition comprising at least one chelating agent selected from the group consisting of methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino)succinic acid, 2-(2-carboxymethylamino)succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof; and introducing the treatment fluid into at least a portion of a subterranean formation.

In one embodiment, the present invention provides a method comprising: providing a treatment fluid that comprises: an aqueous base fluid; and a chelating agent composition comprising at least one chelating agent selected from the group consisting of methylglycine diacetic acid, any salt thereof, any derivative thereof, and any combination thereof; and introducing the treatment fluid into at least a portion of a subterranean formation.

In one embodiment, the present invention provides a method comprising: providing a treatment fluid that comprises: an aqueous base fluid; and a chelating agent composition comprising at least one chelating agent selected from the group consisting of glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino)succinic acid, 2-(2-carboxymethylamino)succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof; and treating a pipe or tubing with the treatment fluid.

The features and advantages of the present invention will be readily apparent to one of ordinary skill in the art upon a reading of the description of the preferred embodiments that follows.

BRIEF DESCRIPTION OF THE DRAWING

The following FIGURE is included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

FIG. 1 shows a fractional pore volume effluent analysis.

DETAILED DESCRIPTION

The present invention generally relates to treatment fluids containing chelating agents, and, more particularly, to treatment methods using treatment fluids that contain biodegradable chelating agents.

There are many advantages of the present invention, only a few of which are discussed or alluded to herein. The compositions and methods of the present invention utilize biodegradable chelating agents that can be used in conjunction with hydrofluoric acid or other matrix acidizing treatments in subterranean formations that avoid many of the disadvantages associated with other chelating agents, including those discussed above. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism or biodegradability, or a specified biodegradation half-life. Because of the chelation effect, the biodegradable chelating agents are able to aid in the dissolution of metal cations, thereby assisting in the prevention or remediation of precipitates that can damage a formation or other surface. Additionally, the biodegradable chelating agents of the present invention can be used in an ammonium or tetraalkylammonium salt form, which has been surprisingly discovered to be particularly advantageous for hydrofluoric acid acidizing operations. Use of the ammonium or tetralkylammonium salt form can avoid the additional precipitation problems that can sometimes occur when other salt forms (e.g., alkali metal salts) are used in the context of this invention. Furthermore, the biodegradable chelating agents and methods of the present invention may be used in prevention embodiments to prevent the formation of precipitates in the presence of hydrofluoric acid, as discussed above, as well as remediation embodiments to remove damage in a well bore or subterranean formation. These features beneficially allow treatment fluids containing glutamic acid diacetic acid ("GLDA") or other biodegradable chelating agents such as, for example, methylglycine diacetic acid ("MGDA"), β-alanine diacetic acid ("β-ADA"), ethylenediaminedisuccinic acid, S,S-ethylenediaminedisuccinic acid ("EDDS"), iminodisuccinic acid ("IDS"), hydroxyiminodisuccinic acid ("HIDS"), polyamino disuccinic acids, N-bis[2-(1,2-dicarboxyethoxy)ethyl]glycine ("BCA6"), N-bis[2-(1,2-dicarboxyethoxy)ethyl]aspartic acid ("BCA5"), N-bis[2-(1,2-dicarboxyethoxy)ethyl]methylglycine ("MCBA5"), N-tris[(1,2-dicarboxyethoxy)ethyl]amine ("TCA6"), N-methyliminodiacetic acid ("MIDA"), iminodiacetic acid ("IDA"), N-(2-acetamido)iminodiacetic acid ("ADA"), hydroxymethyl-iminodiacetic acid, 2-(2-carboxyethylamino)succinic acid ("CEAA"), 2-(2-carboxymethylamino) succinic acid ("CMAA"), diethylenetriamine-N,N"-disuccinic acid, triethylenetetramine-N,N'"-disuccinic acid, 1,6-hexamethylenediamine-N,N'-disuccinic acid, tetraethylenepentamine-N,N""-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, including any salt, derivative, or combination of these chelating agents, to perform single stage treatment operations including, for example, acidizing treatments (e.g., matrix acidizing) and proppant pack treatments, particularly in subterranean formations that have carbonates present, especially those with >10% carbonates. The beneficial effects can be particularly pronounced in treatment operations conducted using hydrofluoric acid or a hydrofluoric acid generating compound. Likewise, beneficial effects can be observed when treating a pipe, tubing, or like vessel, even when the pH is not particularly low.

The treatment fluids of the present invention generally comprise an aqueous base fluid and at least one biodegradable chelating agent. In illustrative embodiments, suitable biodegradable chelating agents can comprise GLDA, any GLDA salt, or any GLDA derivative. In other embodiments, suitable biodegradable chelating agents including MGDA, EDDS, IDS, HIDS, any salt thereof, any derivative thereof, or any combination thereof, including combinations with GLDA, can be used in the treatment fluids. Likewise, any of the previously listed biodegradable chelating agents can also be used in conjunction with the present invention. Particular advantages of some of these chelating agents are considered in more detail hereinafter. Optionally, salts, other pH additives, corrosion inhibitors, surface active agents, anti-sludging agents, mutual solvents, scale inhibitors, viscosifiers, gases, diverting/fluid loss agents, and the like may be included in the treatment fluids of the present invention. The present treatment fluids can be used in subterranean formations to prevent or remediate precipitation damage in the formation caused by the dissolution of formation cations, particularly in the presence of hydrofluoric acid. Likewise, the present treatment fluids can be used in treating pipes, tubing, and like vessels.

Generally, the base fluid of the present invention may comprise any aqueous or non-aqueous fluid. In particular embodiments, the base fluid may comprise fresh water, salt water (e.g., water containing one or more salts dissolved therein), brine (e.g., saturated salt water), sea water, glycol, any combination thereof, or any derivative thereof. In other embodiments, the base fluid may comprise a liquid chelating agent or scale control agent by itself. Generally, the base fluid may be from any source, provided that it does not contain components that might adversely affect the stability and/or performance of the treatment fluids of the present invention.

The chelating agent compositions of the present invention generally comprise a biodegradable chelating agent, any salt thereof, or any derivative thereof. Examples of suitable derivatives of biodegradable chelating agents include esters and alkylated derivatives, for instance. Generally, any derivative can be used, provided that the derivative still maintains an affinity for binding metal cations. Examples of suitable salts of the biodegradable chelating agents include sodium salts, rubidium salts, lithium salts, potassium salts, cesium salts, and ammonium salts, including tetraalkylammonium salts. Mixed salt forms can also be used, if desired.

GLDA is manufactured from a readily biodegradable, renewable, and human-consumable raw material, monosodium glutamate. In addition, GLDA is readily soluble in high concentrations over a wide pH range. In this regard GLDA is thought of as superior to many other chelating agents. GLDA chelates metal ions such as, but not limited to, calcium, iron, aluminum, and magnesium over a wide pH range and is highly soluble in aqueous treatment fluids.

At present, GLDA is commercially available in its sodium salt form. Other salt forms may be available non-commercially, or in smaller quantities, or may be made through an ion-exchange technique discussed below. The preferred form for use in conjunction with the embodiments described herein in which hydrofluoric acid or a hydrofluoric acid generating compound is used is not the monovalent metal salt form (i.e., an alkali metal salt), but rather an ammonium or tetraalkylammonium salt of GLDA. A suitable commercial source of GLDA is a 47 wt. % aqueous solution from Akzo-Nobel Corp. available under the tradename "DISSOLVINE."

MGDA is also commercially available in its sodium salt form. A suitable commercial source of MGDA is a 40 wt. % aqueous solution of the sodium salt form, sold by BASF under the tradename "TRILON M."

For use in some embodiments wherein a sodium salt of GLDA, MGDA, or any other biodegradable chelating agent is available, it may be desirable to exchange the sodium cations for other cations such as, for example, potassium, ammonium or tetraalkylammonium cations. An ammonium or tetraalkylammonium salt is the preferred salt in the context of the present invention for treatment operations conducted in siliceous formations including, for example, clays and sandstones in which hydrofluoric acid or a hydrofluoric acid generating compound is used. In the case of carbonates, the potassium salt is preferred in some embodiments. Exchange of the sodium cations for other cations can avoid precipitation of compounds such as, for example, $NaHSiF_6$. Cation exchange is contemplated to take place under conditions known to one of ordinary skill in the art. Methods for exchanging sodium cations for potassium, ammonium, or tetraalkylammonium cations are contemplated to include, without limitation, ion exchange chromatography and selective precipitation techniques. Other means for exchanging the sodium cations can be envisioned by one having ordinary skill in the art. As discussed further below, it is contemplated that exchange of at least a portion of the sodium cations can produce better solubility properties and beneficially improve other operational characteristics of a treatment fluid containing GLDA or another biodegradable chelating agent of the present invention.

Lesser concentrations of the free acid of the chelating agent can be produced under acidic conditions by diluting the acid in an appropriate volume of water. The amount to include will depend on the specific minerals and quantity present in the subterranean formation, and the purpose of use and desired pH of the biodegradable chelating agent composition. Exemplary ranges are discussed below. In some embodiments, the pH window for clays is about 1 to about 6. In other embodiments, the pH window for clays is about 1.6 to about 4.5. In other embodiments, the pH window for clays is about 1.5 to about 1.8, and in other embodiments about 1.6 to about 3. In some embodiments, the treatment fluid has a pH ranging between about 1.5 and about 5, and in other embodiments, the treatment fluid has a pH ranging between about 1.5 and about 3. Particularly below these ranges, the biodegradable chelating agent may be ineffective for coordinating formation cations, as discussed below. When removing carbonate or carbonate scale, the pH of the treatment fluid may be about 5 to about 10. A preferred pH range for carbonate formations may be 6 to about 9. The pH will be dependent on what purpose the chelating agent will serve downhole. A person having ordinary skill in the art with the benefit of this disclosure will be able to select the appropriate pH for a given application.

In embodiments in which a pipe, tubing, or like vessel is treated with the treatment fluids, higher pH values may be more advantageous due to the possibility of corrosion occurring at lower pH values. In some embodiments, the pH for treating a pipe, tubing, or like vessel can range between about 5 and about 10. In other embodiments, the pH can range between about 5 and about 8 or between about 6 and about 8. In still other embodiments, the pH can be greater than about 8. It should be noted that at these higher pH values, the chelating agents will be significantly deprotonated and operable for chelating metal ions. For some applications such as, for example, the dissolution of barium scales, particularly in a pipe, tubing, or like vessel, high pH values such as about 8 or above or about 10 or above may be beneficial in this regard.

In addition to the intended function that the chelating agent will serve while downhole, the acid dissociation constants of the chelating agent can dictate the pH range over which the treatment fluid can be most effectively used. GLDA, for instance, has a $pK_a$ value of about 2.6 for its most acidic carboxylic acid functionality. Below a pH value of about 2.6, dissolution of formation cations will be promoted primarily by the acidity of a treatment fluid containing GLDA, rather than by chelation, since the chelating agent will be in a fully protonated state. MGDA, in contrast, has a $pK_a$ value in the range of about 1.5 to 1.6 for its most acidic carboxylic acid group, and it will not become fully protonated until the pH is lowered to below about 1.5 to 1.6. In this respect, MGDA is particularly beneficial for use in acidic treatment fluids, since it extends the acidity range by nearly a full pH unit over which the chelating agent is an active chelant. The lower pH of the treatment fluid beneficially allows for a more vigorous acidizing operation to take place. For comparison purposes, the acid dissociation constant of EDDS (2.4) is comparable to that of GLDA.

Of the biodegradable chelating agents described herein, GLDA and MGDA are currently available from commercial sources in bulk quantities with a reliable supply stream. From a supply standpoint, these biodegradable chelating agents are therefore preferred. For the reasons noted above, these chelating agents are operable over a different range of pH values, and they are complementary to one another in this respect. In addition to their pH complementarity, the biodegradable chelating agents described herein can have the capacity for selective chelate formation with different metal ions, both as an inherent function of the chelate stability constant and a kinetic/thermodynamic formation rate as a function of pH. In this regard, other biodegradable chelating agents that are less readily available from commercial sources such as, for example, EDDS, β-ADA, IDS, and/or HIDS can be used singly or combined with GLDA or MGDA in order to "fine tune" the chelation properties of a treatment fluid. Other combinations of biodegradable chelating agents can be considered as well. Table 1 shows an illustrative listing of stability constants for various metal complexes of GLDA, MGDA, EDDS, IDS, HIDS, β-ADA and ethylenediaminetetraacetic acid (EDTA).

TABLE 1

| Chelating Agent | Cation | Log Stability Constant |
|---|---|---|
| EDTA | Fe(III) | 10.65 |
| EDTA | Ca(II) | 25.1 |
| MGDA | Fe(II) | 8.1 |
| MGDA | Fe(III) | 16.5 |
| MGDA | Ca(II) | 6.97 |
| MGDA | Mg(II) | 5.8 |
| GLDA | Ca(II) | 5.9 |
| GLDA | Fe(III) | 11.7 |
| EDDS | Fe(III) | 22.0 |
| EDDS | Ca(II) | 4.58 |
| EDDS | Mg(II) | 6.09 |
| IDS | Fe(III) | 15.2 |
| IDS | Ca(II) | 6.97 |
| IDS | Mg(II) | 4.3-5.8 |
| β-ADA | Fe(III) | 13.3-16 |
| β-ADA | Fe(II) | 8.9 |
| β-ADA | Ca(II) | 5 |
| β-ADA | Mg(II) | 5.3 |
| HIDS | Fe(II) | 6.98 |
| HIDS | Fe(III) | 14.36 |
| HIDS | Ca(II) | 5.12 |

As shown in Table 1, EDDS, for example, can be included in a treatment fluid containing MGDA when a higher affinity for binding of Fe(III) is desired and/or a lower affinity for Ca(II) binding is needed. The combination of MGDA and EDDS has been described for illustrative purposes only, and upon knowing the stability constant of a given chelating agent for a given metal cation, one of ordinary skill in the art will be able to envision an appropriate treatment fluid containing any combination of the biodegradable chelating agents for a given application.

In addition to the stability constant, one of ordinary skill in the art will recognize that the ability of a given chelating agent to react with a given cation will be a function of the treatment fluid's pH. For instance, the maximum chelation of Fe(III) takes place at a pH of about 3 with MGDA and decreases at lower pH values. In contrast, the maximum chelation of Ca(II) and Mg(II) takes place at a higher pH with this chelating agent. Therefore, by adjusting the pH of the treatment fluid, its properties for binding a cation of interest can be altered. In the illustrative example described, a treatment fluid having a pH of about 3 or below can be used to selectively remove Fe(III) cations, while leaving Ca(II) and Mg(II) uncomplexed, thereby not wasting the chelating agent on cations whose chelation is unwanted.

In some embodiments, the chelating agent composition comprises about 1% to about 50% by weight of the treatment fluid. In other embodiments, the chelating agent composition comprises about 3% to about 40% by weight of the treatment fluid. In some or other embodiments, the ratio of the chelating agent composition to water in a treatment fluid is about 1% to about 50% by weight based on a known or existing concentration. In some embodiments, the ratio of the chelating agent composition to water in a treatment fluid is about 1% to about 20% by weight based on a known or existing concentration. In some embodiments, this ratio may be about 3% to about 6%.

In some embodiments, the treatment fluid can further comprise an acid. In some embodiments, the acid can be a mineral acid such as, for example, hydrochloric acid. In some embodiments, the acid can comprise hydrofluoric acid or a hydrofluoric acid generating compound. In some embodiments, the hydrofluoric acid in a treatment fluid of the present invention may be produced from a suitable hydrofluoric acid generating compound. Examples of suitable hydrofluoric acid generating compounds include, but are not limited to, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetic acid complex, boron trifluoride phosphoric acid complex, boron trifluoride dihydrate, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof. When used, a hydrofluoric acid generating compound can be present in the treatment fluids in an amount ranging between about 0.1% to about 20% by weight of the treatment fluid. In other embodiments, an amount of the hydrofluoric acid generating compound can range between about 0.5% to about 10% or about 0.5% to about 8% by weight of the treatment fluid.

The treatment fluids of the present invention may also include a viscoelastic surfactant. Generally, any suitable surfactant that is capable of imparting viscoelastic properties to an aqueous fluid may be used in accordance with the teachings of the present invention. These surfactants may be cationic, anionic, nonionic, zwitterionic or amphoteric in nature, and comprise any number of different compounds, including methyl ester sulfonates (such as those described in commonly owned U.S. Pat. Nos. 7,159,659, 7,299,874, and 7,303,019 and U.S. patent application Ser. No. 11/058,611, filed Feb. 15, 2005 and now available as United States Patent Application Publication 20060183646, each of which is incorporated by reference herein), betaines, modified betaines, sulfosuccinates, taurates, amine oxides, ethoxylated fatty amines, quaternary ammonium compounds, any derivative thereof, and any combination thereof. When present in the treatment fluids of the present invention, the surfactant is generally present in an amount sufficient to provide a desired viscosity (e.g., sufficient viscosity to divert flow, reduce fluid loss, suspend particulates, and the like) through the formation of viscosifying micelles. In particular embodiments, the surfactant generally comprises from about 0.5% to about 10%, by volume, of the treatment fluid. In more particular embodiments, the surfactant comprises from about 1% to about 5%, by volume, of the treatment fluid.

When including a surfactant, the treatment fluids of the present invention may also comprise one or more cosurfactants to, among other things, facilitate the formation of and/or stabilize a foam, facilitate the formation of micelles (e.g., viscosifying micelles), increase salt tolerability, and/or stabilize the treatment fluid. The cosurfactant may comprise any surfactant suitable for use in subterranean environments that does not adversely affect the treatment fluid. Examples of cosurfactants suitable for use in the present invention include, but are not limited to, linear $C_{10}$-$C_{14}$ alkyl benzene sulfonates, branched $C_{10}$-$C_{14}$ alkyl benzene sulfonates, tallow alkyl sulfonates, coconut alkyl glyceryl ether sulfonates, sulfated condensation products of mixed $C_{10}$-$C_{18}$ tallow alcohols with about 1 to about 14 moles of ethylene oxide, and mixtures of higher fatty acids containing about 10 to about 18 carbon atoms. In particular embodiments, the cosurfactant may be present in an amount in the range of from about 0.05% to about 5% by volume of the treatment fluid. In more particular embodiments, the cosurfactant may be present in an amount in the range of from about 0.25% to about 0.5% by volume of the treatment fluid. The type and amount of cosurfactant suitable for a particular application of the present invention may depend upon a variety of factors, such as the type of surfactant present in the treatment fluid, the composition of the treatment fluid, the temperature of the treatment fluid, and the like. A person of ordinary skill in the art, with the benefit of this disclosure, will recognize when to include a cosurfactant in a particular application of the present invention, as well as the appropriate type and amount of cosurfactant to include.

The treatment fluids of the present invention may optionally comprise one or more salts to modify the rheological properties (e.g., viscosity) of the treatment fluids. These salts may be organic or inorganic. Examples of suitable organic salts (or free acid forms of organic salts) include, but are not limited to, aromatic sulfonates and carboxylates (e.g., p-toluenesulfonate and napthalenesulfonate), hydroxynapthalene carboxylates, salicylates, phthalates, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts (e.g., potassium chloride and ammonium chloride). Any combination of the salts listed above also may be included in the treatment fluids of the present invention. Where included, the one or more salts may be present in an amount ranging between about 0.1% to about 75% by weight of the treatment fluid. In more particular embodiments, the one or more salts may be present in an amount ranging from about 0.1% to about 10% by weight of the treatment fluid. A person of ordinary skill in the art, with the benefit of this disclosure, will recognize when to include a salt in a particular application of the present invention, as well as the appropriate type and amount of salt to include.

The treatment fluids of the present invention may also include one or more well-known additives, such as gel stabilizers, fluid loss control additives, particulates, acids, corrosion inhibitors, catalysts, clay stabilizers, biocides, friction reducers, additional surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, and the like. One of ordinary skill in the art, with the benefit of this disclosure, will be able to determine the appropriate type and amount of such additives for a particular application. For example, in some embodiments, it may be desired to foam a treatment fluid of the present invention using a gas, such as air, nitrogen, or carbon dioxide.

In some embodiments, methods described herein comprise providing a treatment fluid that comprises an aqueous base fluid, hydrofluoric acid or a hydrofluoric acid generating compound, and a chelating agent composition comprising glutamic acid diacetic acid, any salt thereof, or any derivative thereof, and introducing the treatment fluid into at least a portion of a subterranean formation. The treatment fluid may remove potentially damaging precipitates from the formation, for example. Any other biodegradable chelating agent described herein can also be used in combination with or in place of the GLDA.

In some embodiments, treatment fluids comprising an aqueous base fluid and a chelating agent composition comprising glutamic acid diacetic acid, any salt thereof, or any derivative thereof are described herein.

In some embodiments, methods described herein comprise providing a treatment fluid that comprises an aqueous base fluid and a chelating agent composition comprising glutamic acid diacetic acid, any salt thereof, or any derivative thereof, and introducing the treatment fluid into at least a portion of a subterranean formation. Any other biodegradable chelating agent described herein can also be used in combination with or in place of the GLDA.

In some embodiments, methods described herein comprise providing a treatment fluid that comprises an aqueous base fluid and a chelating agent composition comprising at least one chelating agent selected from methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino)succinic acid, 2-(2-carboxymethylamino)succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof; and introducing the treatment fluid into at least a portion of a subterranean formation. In some or other embodiments, the treatment fluid can further comprise an acid. In some or other embodiments, the treatment fluid can further comprise hydrofluoric acid or a hydrofluoric acid generating compound.

In some embodiments, methods described herein comprise providing a treatment fluid that comprises an aqueous base fluid and a chelating agent composition comprising at least one chelating agent selected from methylglycine diacetic acid, any salt thereof, any derivative thereof, and any combination thereof; and introducing the treatment fluid into at least a portion of a subterranean formation. In some embodiments, the treatment fluid can further comprise hydrofluoric acid or a hydrofluoric acid generating compound. In some embodiments, the chelating agent composition can be substantially free of alkali metal ions and comprise an ammonium or tetraalkylammonium salt of the biodegradable chelating agent. In some embodiments, other biodegradable chelating agents described herein can be used in combination with methylglycine diacetic acid.

In some embodiments, methods described herein comprise providing a treatment fluid that comprises an aqueous base fluid and a chelating agent composition comprising at least one chelating agent selected from glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino)succinic acid, 2-(2-carboxymethylamino)succinic acid, diethylenetriamine-N,N''-disuccinic acid, triethylenetetramine-N,N'''-disuccinic acid, 1,6-hexamethylenediamine-N,N'-disuccinic acid, tetraethylenep entamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, any salt thereof, any derivative thereof, and any combination thereof; and treating a pipe or tubing with the treatment fluid. In some embodiments, treating a pipe or tubing with the treatment fluid can comprise removing metal ion scale from the pipe or tubing. In some embodiments, the pipe can comprise a well bore penetrating at least a portion of a subterranean formation. In some embodiments, the treatment fluid can have a pH ranging between about 6 and about 8. In other embodiments, the treatment fluid can have a pH of at least about 8.

In some embodiments of the methods of the present invention, an acidic treatment fluid of the present invention that comprises an aqueous base fluid, hydrofluoric acid or a hydrofluoric acid generating compound, and a biodegradable chelating agent composition that comprises glutamic acid diacetic acid, any glutamic acid diacetic acid salt, or any glutamic acid diacetic acid derivative can be used in prevention methods to prevent the formation of precipitates such as, for example, those produced in conjunction with a hydrofluoric acid treatment in a sandstone formation. These embodiments are most appropriate for formations that comprise clays or include cations that can be problematic in terms of precipitate formation. In alternative embodiments, other biodegradable chelating agents such as, for example MGDA, β-ADA, EDDS, IDS, HIDS, any salt thereof, any derivative thereof, any combination thereof, or any other biodegradable chelating agent described herein can be used in place of or in combination with GLDA, any GLDA salt, or any GLDA derivative. Optionally, the hydrofluoric acid or hydrofluoric acid generating compound can be omitted from the treatment fluid, particularly if the subterranean formation being treated is not a sandstone or like siliceous formation.

In some embodiments, the treatment fluids of the present invention may be used as a pre-treatment to a fracturing treatment, especially in subterranean formations that contain different layers of sedimentary rock. In such embodiments, a treatment fluid of the present invention comprising an aqueous base fluid, hydrofluoric acid or a hydrofluoric acid generating compound, and a chelating agent composition of the present invention that comprises glutamic acid diacetic acid, any glutamic acid diacetic acid salt, or any glutamic acid diacetic acid derivative is placed in a subterranean formation via a well bore before a fracturing treatment. The subsequent fracturing treatment can be a traditional fracturing treatment or an additional acidizing treatment directed at treating the particulate pack introduced during the fracturing operation. In such embodiments, the use of the treatment fluid of the present invention may be considered a prevention mechanism to prevent the formation of potentially problematic precipitates. As before, other biodegradable chelating agents such as, for example MGDA, β-ADA, EDDS, IDS, HIDS, any salt thereof, any derivative thereof, combinations thereof, or any other biodegradable chelating agent described herein can be used in place of or in combination with GLDA, any GLDA salt, or any GLDA derivative, and the hydrofluoric acid or hydrofluoric acid generating compound can be optionally omitted.

In some embodiments, a treatment fluid of the present invention comprising an aqueous base fluid, hydrofluoric acid or a hydrofluoric acid generating compound, and a chelating agent composition of the present invention that comprises glutamic acid diacetic acid, any glutamic acid diacetic acid salt, or any glutamic acid diacetic acid derivative may be used to clean the well bore area before bringing the well into final production. Using such a treatment fluid can remove damage, blockages, debris, and natural clays in the formation, for example. In at least some embodiments, this method may be considered a remediation method of the present invention. As before, other biodegradable chelating agents such as, for example MGDA, β-ADA, EDDS, IDS, HIDS, any salt thereof, any derivative thereof, any combination thereof, or any other biodegradable chelating agent described herein can be used in place of or in combination with GLDA, any GLDA salt, or any GLDA derivative, and the hydrofluoric acid or hydrofluoric acid generating compound can be optionally omitted.

In some embodiments, the treatment fluids of the present invention may be useful in formations that comprise siliceous materials, for example, naturally occurring sandstone, propping material, etc. A siliceous material can be naturally present in the formation, e.g., the sandstone, or deliberately introduced, e.g., a quartz proppant. Due to the geochemical processes operative in the formation, such as high temperature, high pressure, and abrupt changes to the geochemical balance after the introduction of treatment fluids of different ionic strength, the siliceous material can undergo rapid changes that lead to reduction of permeability or hydraulic conductivity. When the treatment is carried out in the matrix of the sandstone, the effect is believed to remove aluminosilicates from the conductive pathways. In a particulate pack or a propped fracture, the effects are compounded because, under certain scenarios, geochemical scaling can occur. Another reason is due to fines migration, which is the displacement of particles from the rock matrix into the pack and their subsequent deposition. Furthermore, the presence of aluminum in a sandstone and in those ceramic proppants made of alumina exacerbate the problem due their intrinsic reactivity in low pH media or under abrupt changes to the chemical potential of a fluid leading to dissolution of the material. This signifies that varying amounts of silicon and/or aluminum are placed into solution, can migrate and re-precipitate or crystallize and form new minerals that obstruct the flow of fluids.

In some embodiments where clays or other siliceous minerals are not present in the formation, the treatment fluid may not include hydrofluoric acid or a hydrofluoric acid generating compound. Glutamic acid diacetic acid, any glutamic acid diacetic acid salt, any glutamic acid diacetic acid derivative or any of the alternative biodegradable chelating agents described herein, or any of their salts or derivatives described herein may be sufficient to perform the desired preventive action. In some embodiments where clays are present in the formation, it may be desirable to remediate precipitate damage present in the well bore or in the formation that may be blocking pore throats within the formation. Such methods may be appropriate any time where production has declined due to the presence of particulates or fines that obstruct pore throats in the near well bore area.

In some embodiments, an additional acid can be included in the treatment fluid. In some embodiments, the additional acid can be a mineral acid such as, for example, hydrochloric acid, which may be included in the treatment fluid with hydrofluoric acid or a hydrofluoric acid generating compound. In other embodiments, the additional acid can be an organic acid such as, for example, chloroacetic acid, dichloroacetic acid, trichloroacetic acid, or methanesulfonic acid. In either case, the additional acid can serve to keep the pH of the fluid at a desired low level, particularly a level at which the chelating agent is active for chelation to occur.

In some embodiments, it may be desirable to include a salt or a salt substitute in the treatment fluid. The beneficial effects of a salt or salt substitute are surprising, since it is conventionally believed that adding a salt to a treatment fluid can exacerbate precipitation problems. A preferred example of a suitable salt is ammonium chloride or like ammonium salt. It is believed that this is a problem specific to treatment fluids containing hydrofluoric acid or a hydrofluoric acid generating compound, since alkali metal salts such as sodium and potassium salts can promote the formation of precipitates in the presence of fluoride ions. In contrast, adding an ammonium salt will not exacerbate the precipitation problem.

In some embodiments, the treatment fluids of the present invention may be used to treat a proppant pack, particularly where the proppant pack's hydraulic conductivity has been impacted.

To facilitate a better understanding of the present invention, the following examples of preferred embodiments are given. In no way should the following examples be read to limit, or to define, the scope of the invention.

EXAMPLES

Experiment 1

A solution of DISSOLVINE® (GLNA40S) available from AkzoNobel was used in the preparation of the treatment fluid. A solution containing 3.5 wt. % of GLNA40S was prepared by dissolving 363.5 g of concentrated form into a base fluid. The base fluid consisted of 2% NaCl containing 20 g/L of tannic acid. After fully mixing all components, the pH of the final volume of solution (4 L) was adjusted to pH 1.6 with 35% HCl. The solution was filtered through a 0.40 micron membrane. It was stable for the duration of the testing period (days). A 2"×12" long Hassler sleeve was employed to conduct a core flood acid test at 320° F. The sleeve was packed with a homogenized mixture of quartz (Oklahoma #1 sand) (94 wt. %), K-feldspar (2 wt. %), and the aluminosilicate chlorite (4 wt. %). The pore volume (PV) of the packed column corresponded to 110 mL.

The column was treated with the following fluid sequence:
4 PV, 2% NaCl (pH 6),
2 PV, 3.5% GLNA40S (pH 1.6) with Tannic acid,
3 PV, 5% Ammonium acetate (pH 4.5), and
3 PV, 2% NaCl (pH 6).

The results of the core flood indicated that during the 2 PV of DISSOLVINE® (GLNA40S) exposure, indicated on FIG. 1 by the arrow spanning samples 4-12, the amount of $Al^{3+}$, as detected by ICP-OES, increase gradually until the chelating agent injection was stopped. Once the sand/chlorite pack was no longer exposed to the chelating fluid the aluminum released into solution ceased. The flow rate was 2 mL/min throughout the first 1.5 PV and then increased to 5 mL/min during the last 0.5 PV. The effluent was collected at intervals of 0.5 and 1 PV analyzed for $Al^{3+}$ and $Si^{4+}$ by ICP, no quantitative precipitates were observed in the effluent which was stable for days at room temperature after collection. The respective effluent samples collected for ICP analysis were not acidified with any additional acid, rather they were analyzed in their respective pH at collection time. The amount of silicon remained nearly constant.

Experiment 2

The following description corresponds to visual observations, and titrations conducted. All tests, including the core flood (describe above in Experiment 1), made use of a fluid consisting of DISSOLVINE® GLDA (GL-NA40S) and tannic acid.

The solubility of $Al^{3+}$ in concentrations of 200 to 3000 ppm was independently tested at room temperature. 100 mL of a stock solution (1.45 M pH 1.45) was placed in a stirred beaker, and the pH was gradually raised with strong base (1 M NaOH or 2 M $NH_4OH$ in order to minimize volume changes due to dilution). Precipitation of aluminum hydroxide ensued shortly after reaching pH 2.5 and nearly fully precipitated quantitatively at pH 3 in the absence of any chelating agent. When GLDA was employed in concentrations of 3.5 wt. % or 12 wt. %, precipitation was effectively suppressed as the pH increased from the starting pH of 1.45 to 4. After reaching pH 4, a relatively minor amount of flocculated particles were evident, but no precipitate formed for days. The solution employed of GLDA in this case contained tannic acid, but the latter had no effect on the chelation of $Al^{3+}$. Rather, the effective complexation of $Al^{3+}$ in the presence of another reagent (GLDA) was proven to be effective in the same pH range.

Experiment 3

A glass vial containing 5 g of mineral (clay or quartz) was mixed with 15 or 20 mL of treatment fluid. The treatment fluid was composed of GLDA 15 wt. % and 3 wt. % $NH_4HF_2$ with sufficient HCl to adjust the pH to the indicated value in Table 2 below. The reaction mixtures were heated in a heated cylinder to 95° C. for 0.5, 1, 2, 3, 4 hours and automatically shaken (at 200 rpm). The reaction fluid was collected via a syringe and filtrated through a 0.45 micron membrane filter prior to ICP-AES analysis, the pH of the solution was not adjusted via any means. The elemental analysis for each mineral is provided in Table 2.

It is noteworthy to point out that the point of these experiments was not to optimize the fluid composition, but rather show the effectiveness of the GLDA even in the presence of a hydrofluoric acid generating compound like ammonium bifluoride. While there are sodium pentafluorosilicates and hexafluorosilicates, known damaging precipitates resulting from the reaction of $HSiF_5$-(primary reaction) as identified by powder XRD of the solid mixture after completely drying in an oven at 100° C. for 2-4 h, the amount of dissolved silicon in these fluids remained substantial. The reaction of illite with the fluid showed that the clay was attacked by the fluid as the spent fluid contained all the elements present in the virgin structure. The reaction of chlorite proved to be more effective as demonstrated by the larger concentration of Al and Si, as well as all others having ions. Kaolinite on the other hand showed diminished dissolution, as expected, for this clay mineral under the experiment conditions. Bentonite also showed diminished reactivity, this could be due to actual precipitation for the dissolved silica or pentafluorosilicates. Sand did not significantly react.

TABLE 2

|  | Sample | Al mg/L [ppm] | Si mg/L [ppm] | pH | Vol. (mL) |
|---|---|---|---|---|---|
| Illite | 1 | 816 | 304 | 1.3 | 20 |
|  | 2 | 768 | 309 | 1.3 | 20 |
|  | 3 | 2,041 | 364 | 1.3 | 20 |
|  | 4 | 531 | 258 | 1.3 | 20 |
|  | 5 | 522 | 281 | 1.3 | 20 |
| Chlorite | 6 | 1,789 | 754 | 1.3 | 20 |
|  | 7 | 1,654 | 752 | 1.3 | 20 |
|  | 8 | 1,702 | 748 | 1.3 | 20 |
|  | 9 | 1,400 | 933 | 1.3 | 20 |
|  | 10 | 1,375 | 898 | 1.3 | 20 |
| Kaolinite | 11 | 750 | 220 | 1.3 | 20 |
|  | 12 | 1,167 | 220 | 1.3 | 20 |
|  | 13 | 684 | 197 | 1.3 | 20 |
|  | 14 | 684 | 201 | 1.3 | 20 |
| Bentonite | 15 | 138 | 273 | 3 | 15 |
|  | 16 | 275 | 198 | 3 | 15 |
|  | 17 | 177 | 257 | 3 | 15 |
|  | 18 | 132 | 277 | 3 | 15 |
| Sand | 23 | x | 405 | 1.3 | 20 |
|  | 24 | x | 103 | 1.3 | 20 |
|  | 25 | x | 112 | 1.3 | 20 |
|  | 26 | x | 50 | 1.3 | 20 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A method comprising:
   providing a treatment fluid that comprises:
      an aqueous base fluid;
      a chelating agent composition comprising methylglycine diacetic acid, any salt thereof, any derivative thereof, or any combination thereof;
      a viscoelastic surfactant in an amount from about 0.5% to about 10% by volume of the treatment fluid; and
      a cosurfactant in an amount from about 0.05% to about 5% by volume of the treatment fluid;
      wherein the treatment fluid has a pH of about 1.5 to about 1.8; and
   introducing the treatment fluid into at least a portion of a subterranean formation as a preventative treatment before a subsequent fracturing treatment;
      wherein the preventative treatment prevents the formation of precipitates in the subterranean formation upon dissolution of metal cations by an acid.

2. The method of claim 1, wherein the treatment fluid further comprises hydrofluoric acid or a hydrofluoric acid generating compound that is selected from the group consisting of fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetic acid complex, boron trifluoride phosphoric acid complex, boron trifluoride dihydrate, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

3. The method of claim 1, further comprising:
   performing a stimulation operation in the portion of the subterranean formation.

4. The method of claim 1, further comprising:
   treating a pipe comprising a well bore penetrating the subterranean formation.

5. The method of claim 1, wherein introducing the treatment fluid takes place at a pressure that is less than a fracturing pressure of the subterranean formation.

6. A method comprising:
   providing a treatment fluid that comprises:
      an aqueous base fluid;
      a chelating agent composition comprising a first chelating agent comprising methylglycine diacetic acid, any salt thereof, any derivative thereof, or any combination thereof, and a second chelating agent selected from the group consisting of β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxyl)ethyl]glycine, N-bis[2-(1,2-dicarboxyethoxyl)ethyl]aspartic acid, N-bis[2-(1,2-dicarboxyethoxyl)ethyl]methylglycine, N-tris[(1,2-dicarboxyethoxy)ethyl]amine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, glutamic acid diacetic acid, any salt thereof, any derivative thereof, and any combination thereof;
a viscoelastic surfactant in an amount from about 0.5% to about 10% by volume of the treatment fluid; and
a cosurfactant in an amount from about 0.05% to about 5% by volume of the treatment fluid;
wherein the treatment fluid has a pH of about 1.5 to about 1.8; and
introducing the treatment fluid into at least a portion of a subterranean formation as a preventative treatment before a subsequent fracturing treatment;
wherein the preventative treatment prevents formation of precipitates in the subterranean formation upon dissolution of metal cations by an acid.

7. The method of claim 6, wherein the treatment fluid further comprises hydrofluoric acid or a hydrofluoric acid generating compound.

8. The method of claim 7, wherein the hydrofluoric acid generating compound is selected from the group consisting of fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetic acid complex, boron trifluoride phosphoric acid complex, boron trifluoride dihydrate, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

9. The method of claim 7, wherein the chelating agent composition is substantially free of alkali metals and comprises an ammonium or tetraalkylammonium salt of at least one of the chelating agents.

* * * * *